United States Patent
Visco et al.

(10) Patent No.: US 7,432,017 B2
(45) Date of Patent: Oct. 7, 2008

(54) COMPOSITIONS AND METHODS FOR PROTECTION OF ACTIVE METAL ANODES AND POLYMER ELECTROLYTES

(75) Inventors: Steven J. Visco, Berkeley, CA (US); Yevgeniy S. Nimon, Danville, CA (US); Bruce D. Katz, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 668 days.

(21) Appl. No.: 10/686,041

(22) Filed: Oct. 14, 2003

(65) Prior Publication Data

US 2004/0131944 A1 Jul. 8, 2004

Related U.S. Application Data

(60) Provisional application No. 60/418,899, filed on Oct. 15, 2002.

(51) Int. Cl.
*H01M 2/16* (2006.01)
*H01M 4/62* (2006.01)
*H01M 4/66* (2006.01)

(52) U.S. Cl. .................. 429/232; 429/246; 429/231.95; 429/218.1; 429/245; 429/315; 429/321

(58) Field of Classification Search .................. 429/122, 429/218.1, 231.95, 232
See application file for complete search history.

(56) References Cited

U.S. PATENT DOCUMENTS 3,666,560 A * 5/1972 Cairns et al. ................. 429/103
4,148,976 A * 4/1979 Sekido et al. ............... 429/307
4,162,202 A 7/1979 Dey (Continued)

FOREIGN PATENT DOCUMENTS

| EP | 0111213 A2 | 11/1983 |
| EP | 0111214 B1 | 11/1983 |
| EP | 0875951 A1 | 11/1998 |
| EP | 0689260 B1 | 4/1999 |

OTHER PUBLICATIONS

Nippon Telegr & Teleph Corp., "Patent Abstracts of Japan," vol. 008, No. 119 (E-248), Jun. 5, 1984 & JP 59 031573 A, Feb. 20, 1984.

(Continued)

*Primary Examiner*—Patrick Ryan
*Assistant Examiner*—Helen O. K. Chu
(74) *Attorney, Agent, or Firm*—Weaver Austin Villeneuve & Sampson LLP

(57) ABSTRACT

Electrochemical structures with a protective interlayer for prevention of deleterious reactions between an active metal electrode and polymer electrolytes, and methods for their fabrication. The structures may be incorporated in battery cells. The interlayer is capable of protecting an active metal anode and a polymer electrolyte from deleterious reaction with one another while providing a high level of ionic conductivity to enhance performance of a battery cell in which the structure is incorporated. The interlayer has a high ionic conductivity, at least $10^{-7}$ S/cm, generally at least $10^{-6}$ S/cm, and as high as $10^{-3}$ S/cm or higher. The interlayer may be composed, in whole or in part, of active metal nitrides, active metal phosphides or active metal halides. These materials may be applied preformed, or they may be formed in situ by conversion of applied precursors on contact with the active metal anode material.

8 Claims, 5 Drawing Sheets

U.S. PATENT DOCUMENTS

| | | | |
|---|---|---|---|
| 4,226,924 A * | 10/1980 | Kimura et al. | 429/126 |
| 4,833,048 A | 5/1989 | De Jonghe et al. | |
| 4,917,974 A | 4/1990 | Visco et al. | |
| 4,981,672 A | 1/1991 | De Neufville et al. | |
| 4,985,317 A | 1/1991 | Adachi et al. | |
| 5,100,523 A | 3/1992 | Helms et al. | |
| 5,162,175 A | 11/1992 | De Jonghe et al. | |
| 5,314,765 A | 5/1994 | Bates | |
| 5,336,384 A | 8/1994 | Tsou et al. | |
| 5,338,625 A | 8/1994 | Bates et al. | |
| 5,342,710 A | 8/1994 | Koksbang | |
| 5,387,479 A | 2/1995 | Koksbang | |
| 5,409,786 A | 4/1995 | Bailey | |
| 5,455,126 A | 10/1995 | Bates et al. | |
| 5,512,147 A | 4/1996 | Bates et al. | |
| 5,516,598 A | 5/1996 | Chu et al. | |
| 5,523,179 A | 6/1996 | Chu | |
| 5,532,077 A | 7/1996 | Chu | |
| 5,567,210 A | 10/1996 | Bates et al. | |
| 5,569,520 A | 10/1996 | Bates | |
| 5,582,623 A | 12/1996 | Chu | |
| 5,597,660 A | 1/1997 | Bates et al. | |
| 5,612,152 A | 3/1997 | Bates | |
| 5,648,187 A | 7/1997 | Skotheim | |
| 5,686,201 A | 11/1997 | Chu | |
| 5,696,201 A | 12/1997 | Cavalloni et al. | |
| 5,702,995 A | 12/1997 | Fu | |
| 5,789,108 A | 8/1998 | Chu | |
| 5,814,420 A | 9/1998 | Chu | |
| 5,882,812 A | 3/1999 | De Jonghe et al. | |
| 5,961,672 A | 10/1999 | Skotheim et al. | |
| 6,017,651 A | 1/2000 | Chu et al. | |
| 6,025,094 A | 2/2000 | Visco et al. | |
| 6,030,720 A | 2/2000 | Katz et al. | |
| 6,030,909 A | 2/2000 | Fu | |
| 6,110,236 A | 8/2000 | Chu et al. | |
| 6,165,644 A | 12/2000 | Chu et al. | |
| 6,183,901 B1 | 2/2001 | Ying et al. | |
| 6,198,701 B1 | 3/2001 | De Jonghe et al. | |
| 6,200,704 B1 | 3/2001 | De Jonghe et al. | |
| 6,210,832 B1 | 4/2001 | Chu et al. | |
| 6,214,061 B1 | 4/2001 | Visco et al. | |
| 6,225,002 B1 | 5/2001 | Chu et al. | |
| 6,248,481 B1 | 6/2001 | De Jonghe et al. | |
| 6,315,881 B1 | 11/2001 | Fu | |
| 6,358,643 B1 | 3/2002 | Katz et al. | |
| 6,376,123 B1 | 4/2002 | Chu | |
| 6,402,795 B1 | 6/2002 | Chu et al. | |
| 6,413,284 B1 | 7/2002 | Chu et al. | |
| 6,413,285 B1 | 7/2002 | Chu et al. | |
| 6,432,584 B1 | 8/2002 | Visco et al. | |
| 6,475,677 B1 | 11/2002 | Inda et al. | |
| 6,485,622 B1 | 11/2002 | Fu | |
| 6,537,701 B1 | 3/2003 | Chu et al. | |
| 6,632,573 B1 | 10/2003 | Nimon et al. | |
| 6,723,140 B2 | 4/2004 | Chu et al. | |
| 6,737,197 B2 | 5/2004 | Chu et al. | |
| 6,911,280 B1 | 6/2005 | De Jonghe et al. | |
| 6,955,866 B2 | 10/2005 | Chu et al. | |
| 6,991,662 B2 | 1/2006 | Visco et al. | |
| 7,070,632 B1 | 7/2006 | Visco et al. | |
| 2002/0034688 A1 * | 3/2002 | Chu et al. | 429/232 |

OTHER PUBLICATIONS

R&D Research & Development, R&D Magazine, vol. 39, No. 10, Sep. 1997, www.rdmag.com, p. 65.

Steven D. Jones, et al., "Thin film rechargeable Li batteries", 1994, *Solid State Ionics*, no month.

J.B. Bates, et al., "Thin-film rechargeable lithium batteries," 1995, *Journal of Power Sources*, no month.

N. J. Dudney, et al., "Sputtering of lithium compounds for preparation of electrolyte thin films," 1992, *Solid State Ionics*, no month.

J. B. Bates, et al., "Electrical properties of amorphous lithium electrolye thin film," 1992, *Solid State Ionics*, no month.

Xiaohua Yu, et al, "A Stable Thin-Film Lithium Electrolyte: Lithium Phosphorus Oxynitride," Feb. 1997, *J. Electrochem. Soc.*, vol. 144, No. 2.

Fu, Jie, "Fast Li+ Ion Conduction in Li2O-Al2O3-TiO2-SiO2-P2O5 Glass-Ceramics", Journal of the American Ceramics Society, vol. 80, No. 7, Jul. 1997, pp. 1-5.

Aono et al., "Ionic Conductivity of the Lithium Titanium Phosphate ($Li_{1+x}M_xTi_{2-x}(PO_4)_3$, M=Al, Sc, Y, and La) Systems", Dept. of Industrial Chemistry, pp. 590-591, no date.

Aono, Hiromichi, "High Li+ Conducting Ceramics", Acc. Chem. Res. vol. 27, No. 9, 1994, pp. 265-270, no month.

Aono, et al., "Ionic Conductivity and Sinterability of Lithium Titanium Phosphate System", Solid State Ionics, 40/41 (1990), pp. 38-42, no month.

Aono, et al., "Electrical properties and crystal structure of solid electrolyte based on lithium hafnium phosphate $LiHf_2(PO_4)_3$", Solid State Ionics 62 (1993), pp. 309-316, no month.

Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264, no month.

Aono, et al., "Ionic Conductivity of $\beta=Fe_2(SO_4)_3$ Type $Li_3Cr_2(PO_4)_3$ Based Electrolyte", Chemistry Letters, 1993, pp. 2033-2036, no month.

Aono, et al., "Ionic Conductivity of $LiTi_2(PO_4)_3$ Mixed with Lithium Salts", Chemistry Letters, 1990, pp. 331-334, no month.

Fu, Jie, "Superionic conductivity of glass-ceramics in the system $Li_2O-Al_2O_3-TiO_3-P_2O_5$", Solid State Ionics, 96 (1997), pp. 195-200, no month.

Fu, Jie, "Fast Li+ ion conducting glass-ceramics in the system $Li_2O-Al_2O_3-GeO_2-P_2O_5$" Solid State Ionics 104 (1997), pp. 191-194, no month.

Aono, et al., "DC Conductivity of $Li_{1.3}Al_{0.3}Ti_{1.7}(PO_4)_3$ Ceramic with Li Electrodes", Chemistry Letters, 1991, pp. 1567-1570, no month.

Aono, et al., "Electrical Properties of Sintered Lithium Titanium Phosphate Ceramics ($Li_{1+x}M_xTi_{2-x}PO_4)_3,M^{3+}=Al_3,Sc^{3+}$, or $Y^{3+}$)", Chemistry Letters, 1990, pp. 1825-1828, no month.

Button, et al., "Structural disorder and enhanced ion transport in amorphous conductors", Solid State Ionics, vols. 9-10, Part 1, Dec. 1983, pp. 585-592 (abstract).

* cited by examiner

COMPOSITIONS AND METHODS FOR PROTECTION OF ACTIVE METAL ANODES AND POLYMER ELECTROLYTES

CROSS-REFERENCE TO RELATED APPLICATIONS

This application claims priority to U.S. Provisional Patent Application No. 60/418,899 filed Oct. 15, 2002, titled IONICALLY CONDUCTIVE COMPOSITES FOR PROTECTION OF ANODES AND ELECTROLYTES. This provisional patent application is incorporated herein by reference in its entirety for all purposes.

BACKGROUND OF THE INVENTION

1. Field of the Invention

The present invention relates generally to electrode structures for use in electrochemical devices. More particularly, this invention relates to interlayers for protection of anodes and polymer electrolytes in electrochemical structures from deleterious reaction with one another, and methods for their fabrication.

2. Description of Related Art

Lithium is an attractive material for use as an electrode component in electrochemical devices, such as batteries and capacitors, due to its very high energy density and low equivalent weight. However, lithium is highly reactive in ambient atmosphere and with a variety of other electrochemical device components, in particular polymer electrolytes, and thus its incorporation into electrochemical devices requires special processing. Typically, lithium battery manufacture is conducted in inert environments in order to guard against degradation of lithium until it is hermetically sealed within a battery cell container.

Even with these precautions, lithium may detrimentally react with incompatible materials in the processing environment. To address these problems, some researchers have proposed that the electrolyte facing side of the lithium negative electrode be coated with a "protective layer." Several types of protective layers and methods for producing them have been proposed. Prior methods have generally focused on the application of a protective layer to a preformed lithium electrode.

Some research has focused on "nitridation" of the lithium metal surface as a means for protecting lithium electrodes. In such process, a bare lithium metal electrode surface is reacted with a nitrogen plasma to form a surface layer of polycrystalline lithium nitride ($Li_3N$). This nitride layer conducts lithium ions and at least partially protects the bulk lithium of the negative electrode from a liquid electrolyte. A process for nitriding lithium battery electrodes it is described in R&D Magazine, September 1997, p. 65 (describing the work of S. A. Anders, M. Dickinson, and M. Rubin at Lawrence Berkeley National Laboratory). Unfortunately, the surface of lithium is very rough making it almost impossible to nitride, and lithium nitride decomposes when exposed to moisture. While lithium metal batteries employ nonaqueous electrolytes, it is very difficult to remove all traces of moisture from the electrolyte. Thus, trace moisture will ultimately compromise the protective properties of the lithium nitride.

Other pre-formed lithium protective layers have been contemplated. Most notably, U.S. Pat. No. 5,314,765 (issued to Bates on May 24, 1994) describes a lithium electrode containing a thin layer of sputtered lithium phosphorus oxynitride ("LiPON") or related material. LiPON is a single ion (lithium ion) conducting glass. It is typically deposited by reactive sputtering of a lithium phosphate in the presence of nitrogen. The nitrogen, however, attacks the lithium surface, thereby making the process of direct deposition of the glass film impossible. Work in the present applicants' laboratories has developed technology for the use of glassy or amorphous protective layers, such as LiPON, in active metal battery electrodes (see, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, issued to Chu and Visco, et al. and assigned to PolyPlus Battery Company).

Some contemplated lithium metal protective layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode. Other examples of potential protective layers may include the deposition of polymer layers that involve solvents or monomers that are incompatible with lithium.

The existing approaches do not provide for the fabrication of a lithium electrode and polymer electrolyte laminate without a barrier layer that substantially impedes ion conductivity.

Accordingly, it would be desirable to provide a protective layer having high ionic conductivity between a lithium electrode and a polymer electrolyte. In particular fabrication processing and successful operation of active metals, such as lithium, as battery electrodes would be enhanced by the provision of such a protective layer.

SUMMARY OF THE INVENTION

The present invention provides electrochemical structures with a protective interlayer for prevention of deleterious reactions between an active metal electrode and polymer electrolytes, and methods for their fabrication. The structures may be incorporated in battery cells. The interlayer is capable of protecting an active metal anode and a polymer electrolyte from deleterious reaction with one another while providing a high level of ionic conductivity to enhance performance of a battery cell in which the structure is incorporated. The interlayer has a high ionic conductivity, at least $10^{-7}$ S/cm, generally at least $10^{-6}$ S/cm, and as high as $10^{-3}$ S/cm or higher.

A wide variety of materials may be used in fabricating protective interlayers in accordance with the present invention, consistent with the principles described above. For example, the interlayer may be composed, in whole or in part, of active metal nitrides, active metal phosphides or active metal halides. Specific examples include $Li_3N$, $Li_3P$, LiI, LiBr, LiCl and LiF. These materials may be applied preformed, or they may be formed in situ by conversion of applied precursors such as metal nitrides, metal phosphides, metal halides, red phosphorus, iodine, nitrogen or phosphorus containing organics and polymers, and the like, on contact with the active metal anode material. The in situ formation of the first layer may result from an incomplete conversion of the precursors to their lithiated analog. Nevertheless, such incomplete conversions meet the requirements of a first layer material for a protective interlayer in accordance with the present invention and are therefore within the scope of the invention.

The interlayer may be formed using a variety of techniques. These include deposition or evaporation (including e-beam evaporation) of a layer of a protective interlayer or protective interlayer precursor material. Also, as noted above, the active metal electrode adjacent layer may be formed in situ from the non-deleterious reaction of one or more precursors with the active metal electrode. For example, a $CuN_3$ layer may be formed on a polymer electrolyte. The precursor coated polymer electrolyte may then be contacted with a Li anode (e.g., lithium may be directly evaporated onto the precursor-coated polymer electrolyte) resulting in the formation of $LiN_3$ at the Li anode surface. As another example, an $LiP_3$ interlayer may be formed by contacting a layer of red phosphorus on formed a polymer electrolyte with an Li anode.

The invention encompasses protected a node structures composed of a nodes, interlayers and polymer electrolytes. Battery cells and methods for making anode structures and battery cells are also provided.

In one aspect, the invention relates to an electrochemical device component structure. The structure includes an active metal electrode, a polymer electrolyte, and a protective interlayer between the electrode and the polymer electrolyte, the interlayer composed in whole or in part of a material conductive to ions of the active metal and chemically compatible with the active metal and the polymer electrolyte including nitrides, phosphides and halides of the active metal.

These and other features of the invention will be further described and exemplified in the detailed description below.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

The present invention provides electrochemical structures with a protective interlayer for prevention of deleterious reactions between an active metal electrode and polymer electrolytes, and methods for their fabrication. The structures may be incorporated in battery cells. The interlayer is capable of protecting an active metal anode and a polymer electrolyte from deleterious reaction with one another while providing a high level of ionic conductivity to enhance performance of a battery cell in which the structure is incorporated.

The interlayer is composed of a material that is both ionically conductive and chemically compatible with an active metal and a polymer electrolyte between which it is disposed. The interlayer has a high ionic conductivity, at least $10^{-7}$ S/cm, generally at least $10^{-6}$ S/cm, and as high as $10^{-3}$ S/cm or higher. By "chemical compatibility" (or "chemically compatible") it is meant that the referenced material does not react to form a product that is deleterious to battery cell operation when contacted with one or more other referenced battery cell components. Chemical compatibility in this aspect of the invention refers both to a material that is chemically stable and therefore substantially unreactive when contacted with an active metal electrode material. It also refers to a material that may be reactive when contacted with an active metal electrode material to produce a product that is chemically stable against the active metal electrode material and retains the desirable ionic conductivity. Such a reactive material is sometimes referred to as a "precursor" material.

It should be noted that the interlayer is inherently ionically conductive. That is, it does not depend on the presence of a liquid electrolyte or solvent or other agent for its ionically conductive properties.

Protective Interlayer Structures

Figure 1:
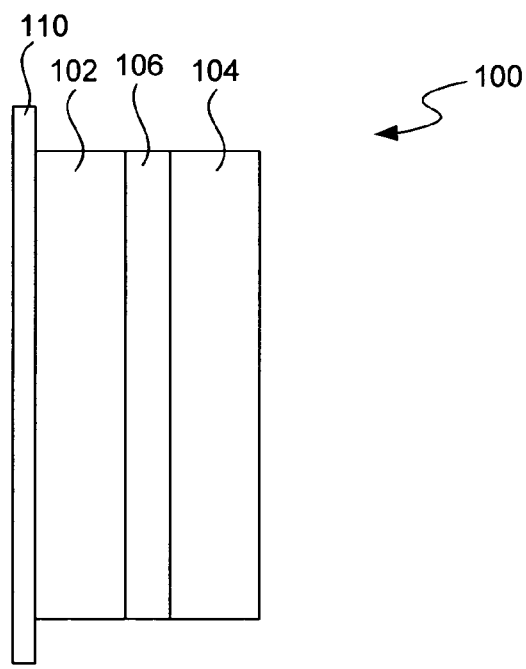
FIG. 1 is a schematic illustration of an Electrochemical device structure incorporating an ionically conductive and chemically compatible protective interlayer in accordance with the present invention.

FIG. 1 illustrates an electrochemical structure incorporating an ionically conductive chemically compatible protective interlayer in accordance with the present invention. The structure 100 includes an active metal electrode 102. Active metals are highly reactive in ambient conditions and can benefit from a barrier layer when used as electrodes. They are generally alkali metals such as (e.g., lithium, sodium or potassium), alkaline earth metals (e.g., calcium or magnesium), and/or certain transitional metals (e.g., zinc) and/or alloys of two or more of these. The following active metals may be used: alkali metals (e.g., Li, Na, K), alkaline earth metals (e.g., Ca, Mg, Ba), or binary or ternary alkali metal alloys with Ag, Ca, Mg, Sn, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium.

The electrode is typically bonded on one surface with a current collector 110 composed of a conductive metal, for example copper. However, the structure need not included a current collector 110 and/or the current collector may be bonded to the exposed surface of the electrode subsequently, for example during processing to form a battery cell.

The structure 100 also includes a polymer electrolyte 104. In general, any polymer electrolyte suitable for use in an active metal battery cell may be used. For example, polymer electrolytes such as polyethylene oxide (PEO), polypropylene oxide (PPO), polyimide, and Nafion based membranes such as Li-ion based Nafions and fiber reinforced polymer electrolytes such as fiber reinforced PEO and fiber reinforced Nafion (i.e., GORE-SELECT, available from W. L. Gore and Associates) may be used in accordance with the present invention.

A protective interlayer 106 is disposed between the active metal electrode 102 and the polymer electrolyte 104. The protective interlayer 106 is composed of a material that is both ionically conductive and chemically compatible with an active metal electrode material and a polymer electrolyte. The thickness of the interlayer is enough to prevent contact between the active metal anode and the polymer electrolyte, preferably about 0.1 to 5 microns, or 0.2 to 1 micron, for example about 0.25 micron.

A wide variety of materials may be used as protective interlayers in accordance with the present invention, consistent with the principles described herein. For example, the interlayer may be composed, in whole or in part, of active metal nitrides, active metal phosphides or active metal halides. Specific examples include $Li_3N$, $Li_3P$, LiI, LiBr, LiCl and LiF.

As described further below, these materials may be applied preformed, or they may be formed in situ by conversion of applied precursors such as metal nitrides, metal phosphides, metal halides, red phosphorus, iodine, nitrogen or phosphorus containing organics and polymers, and the like, on contact with the active metal anode material. The in situ formation of the interlayer may result from an incomplete conversion of the precursors to their lithiated analog. Nevertheless, such incomplete conversions meet the requirements of an interlayer material for a protective interlayer in accordance with the present invention and are therefore within the scope of the invention.

Fabrication Methods

As noted above, a protective interlayer in accordance with the present invention may be formed using a variety of methods. These include deposition or evaporation (including e-beam evaporation) of a layer of a protective interlayer or protective interlayer precursor material. Also, as noted above, the interlayer may be formed in situ from the non-deleterious reaction of one or more precursors with the active metal electrode.

Figure 2:
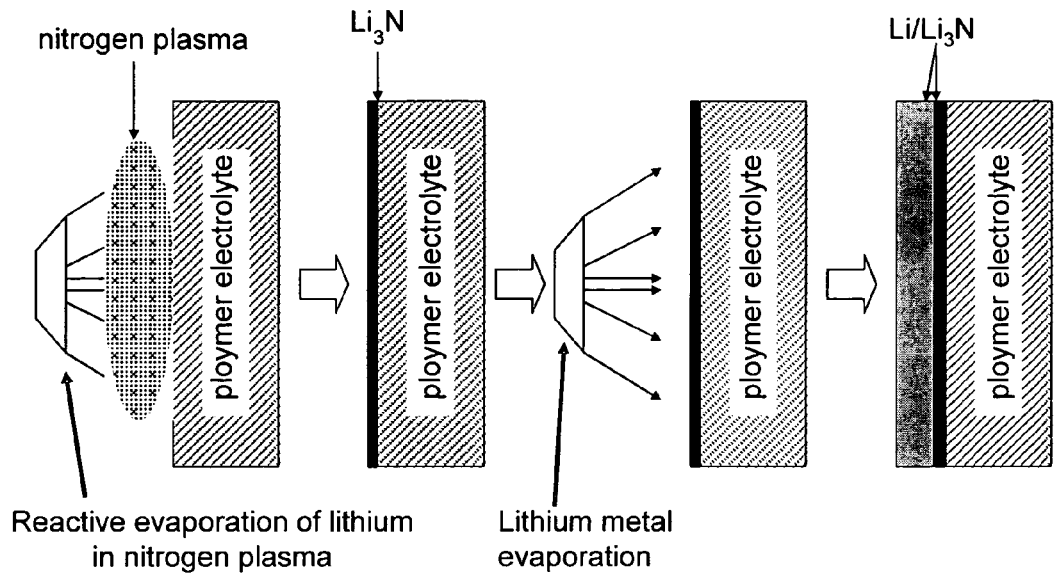
FIGS. 2-6 are schematic illustrations of alternative methods of making an electrochemical device structure incorporating an ionically conductive and chemically compatible protective interlayer in accordance with the present invention.

Referring to FIG. 2, a first method for forming a protective interlayer in accordance with the present invention is shown. The ionically conductive chemically compatible interlayer material is directly deposited onto the polymer electrolyte. This can be done by a variety of techniques including RF sputtering, e-beam evaporation, thermal evaporation, or reactive thermal or e-beam evaporation, for example. In the particular example illustrated in the figure, lithium is evaporated into a nitrogen plasma to form a lithium nitride ($Li_3N$) layer on the polymer electrolyte, for example one composed of PEO, surface. This is followed by evaporation of lithium metal onto the $Li_3N$ film. The $Li_3N$ interlayer separates the lithium metal electrode from the polymer electrolyte, but allows Li ions to pass from the Li electrode to the polymer electrolyte. Of course, other active metal, polymer electrolyte and interlayer materials, as described herein, may be used as well.

Figure 3:
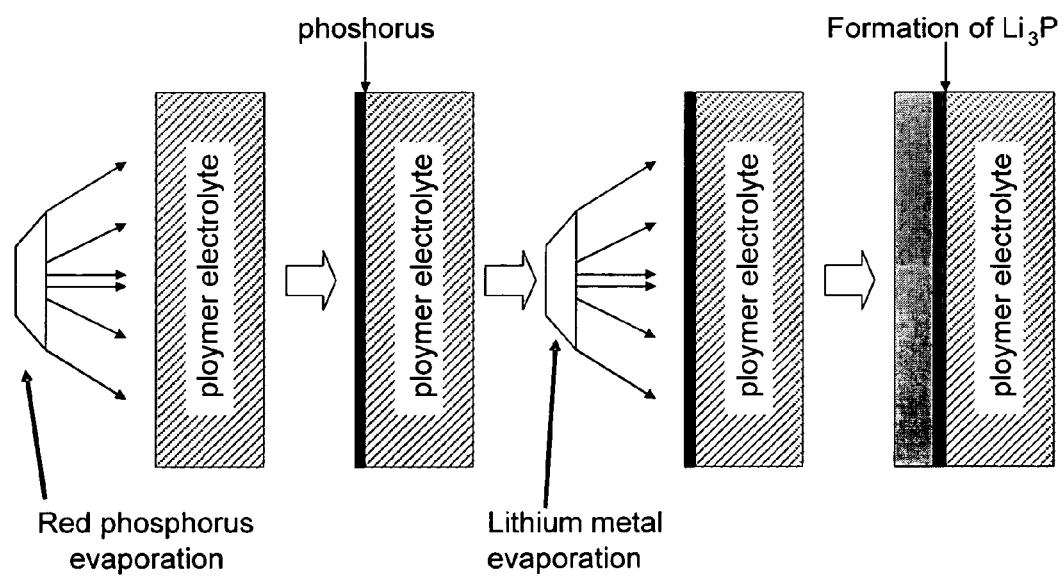

Alternatively, referring to FIG. 3, a second method for forming a protective interlayer in accordance with the present invention is shown. The ionically conductive chemically compatible interlayer material is formed in situ following formation of a precursor layer on the polymer electrolyte. In the particular example illustrated in the figure, a surface of a polymer electrolyte, for example one composed of PEO, is coated with red phosphorus, a precursor for an active metal (in this case lithium) phosphide. Then a layer of lithium metal is deposited onto the phosphorus. The reaction of lithium and phosphorus forms $Li_3P$ according to the following reaction: $3Li+P=Li_3P$. $Li_3P$ is an ionically conductive material that is chemically compatible with both the lithium anode and the polymer electrolyte. In this way, the polymer electrolyte is not in direct contact with the lithium electrode. Of course, other active metal, polymer electrolyte and interlayer precursor materials, as described herein, may be used as well. Alternative precursor examples include $CuN_3$, which may be formed as a thin layer on a polymer electrolyte, such as PEO and contacted with a Li anode in a similar manner according to the following reaction: $3Li+Cu_3N=Li_3N+3$ Cu; or lead iodide which may be formed as a thin layer on a polymer electrolyte and contacted with a Li anode in a similar manner according to the following reaction: $2Li+PbI_2=2$ LiI+Pb.

Figure 4:
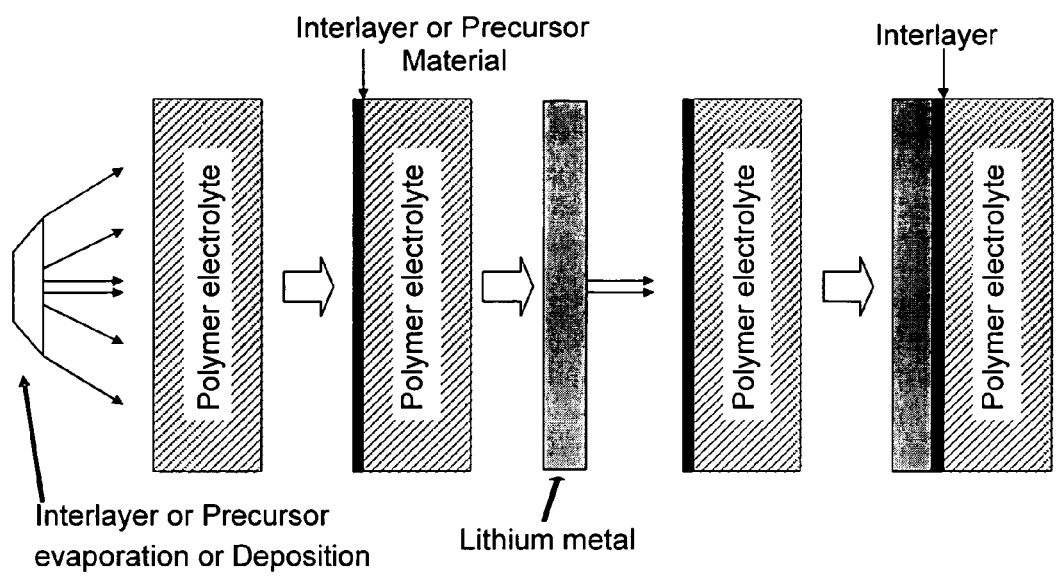

In either of the forgoing methods, rather than forming a lithium (or other active metal) layer on the protective interlayer material or precursor, the protective interlayer material or precursor material may be contacted with the lithium by bonding metallic lithium to the protective interlayer material or precursor, for example by direct contact with extruded lithium metal foil. This alternative is illustrated for either of the FIG. 2 or FIG. 3 methods in FIG. 4.

In an alternative embodiment of the invention the interlayer layer may also include additional components. For instance, a suitable protective interlayer may include a polymer component to enhance its properties. For example, polymer-iodine complexes like poly(2-vinylpyridine)-iodine (P2VP-$I_2$), polyethylene-iodine, or tetraalkylammonium-iodine can react with Li to form an ionically conductive LiI-based film that is chemically compatible with both an active metal and a polymer electrolyte. Without intending to be bound by theory, it is expected that the use of polymer-iodine charge transfer complexes can lead to formation of composites containing LiI and polymer and having significantly higher ionic conductivity than that for pure LiI. Other halogens may also be used in this manner, for example in bromine complexes.

Figure 5:
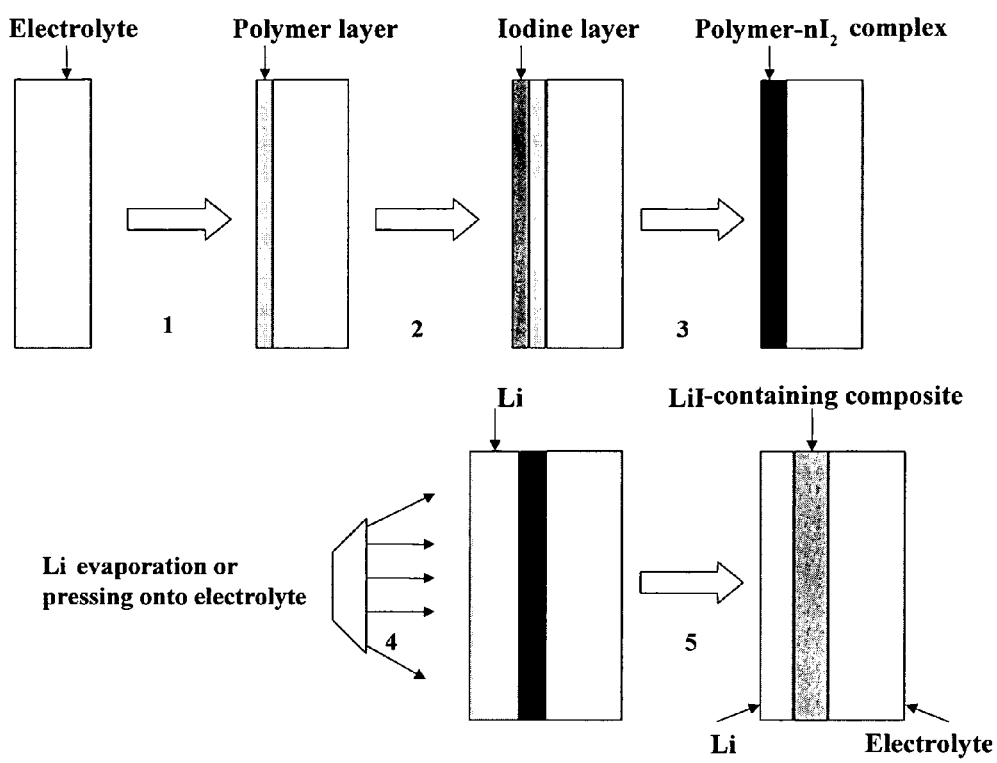

Referring to FIG. 5, a first embodiment of this aspect of the present invention is shown. A polymer layer and a layer of iodine are coated on a polymer electrolyte surface and allowed to react forming polymer-iodine complex.

According to this method, a thin layer of polymer may be applied to the polymer electrolyte (e.g. PEO) using brushing, dipping, or spraying. For example, a conductive glass layer may be coated with a thin (e.g, 0.5 to 2.0 micron, preferably 0.1 to 0.5 micron) layer of P2VP in this way.

One technique for applying an iodine coating is sublimation of crystalline iodine that can be achieved at room temperature (e.g., about 20 to 25° C.) in a reactor placed in the dry box or in a dry room. A sublimed layer of iodine can be made very thin (e.g., 0.05 to 1.0 microns and the rate of sublimation can be adjusted by varying the temperature or distance between the substrate and source of iodine.

Alternatively, high concentrations (e.g., 50 to 100 g/liter of iodine can be dissolved in an organic solvent, such as acetonitrile and n-heptane. Dissolved iodine can be coated on the conductive glass surface by such methods as dip coating, spraying or brushing, among others. In this case, treatment conditions can be easily changed by varying the length of coating treatment and iodine concentrations. Examples of iodine sources for this technique include metal iodides are AgI and $PbI_2$, which are known to be used as the cathode materials in solid-state batteries with Li anode and LiI-based solid electrolyte.

Then, lithium (or other active metal) is contacted with the polymer-iodine complex on the polymer electrolyte, for example by evaporation or pressing onto the electrolyte coated with this complex. The result is a LiI-containing composite protective interlayer between the Li anode and the polymer electrolyte.

Figure 6:
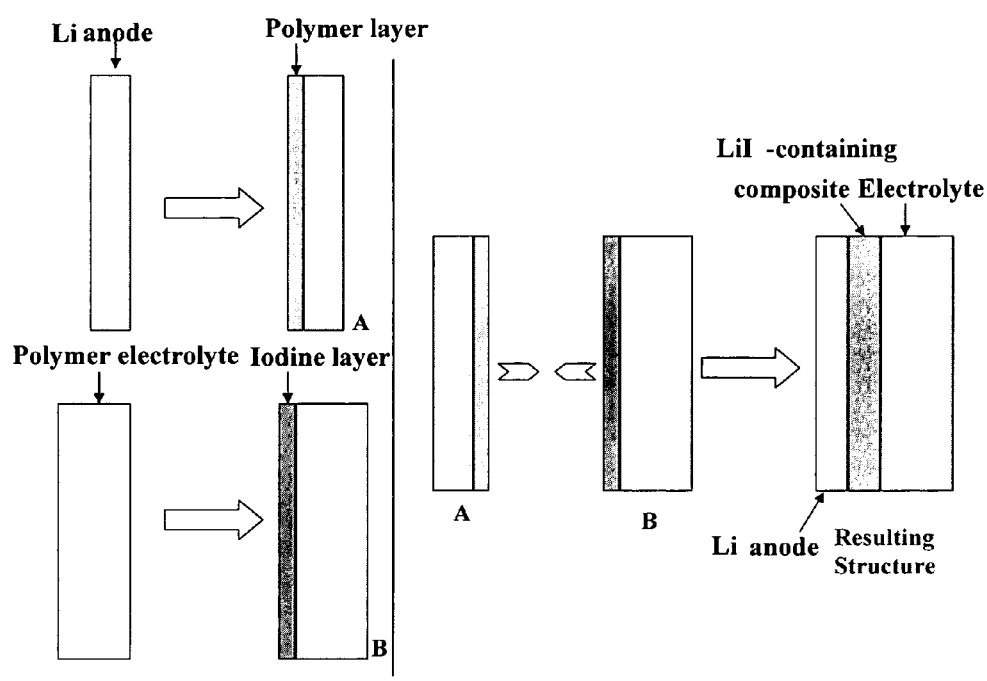

Referring to FIG. 6, an alternative embodiment of this aspect of the present invention is shown. A polymer electrolyte surface is coated with a thin layer of iodine, such as by a technique described above, that can react with Li forming LiI layer (A).

Active metal, for example lithium foil, can be coated with a thin layer of polymer (B), for example as described above, and then contacted with the iodine layer on the polymer electrolyte. After assembly, iodine reacts with the polymer layer and, as a result, LiI-containing protective interlayer with reduced impedance is formed.

Battery Cells

Electrochemical structures incorporating a protective interlayer in accordance with the present invention may be incorporated in active metal-based battery cells such as are described in Applicant's prior U.S. Patents and patent applications including U.S. Pat. No. 6,025,094 incorporated herein by reference in its entirety and for all purposes. The protected anodes may be used in primary or secondary battery cells. One preferred implementation is in lithium-sulfur batteries.

Figure 7:
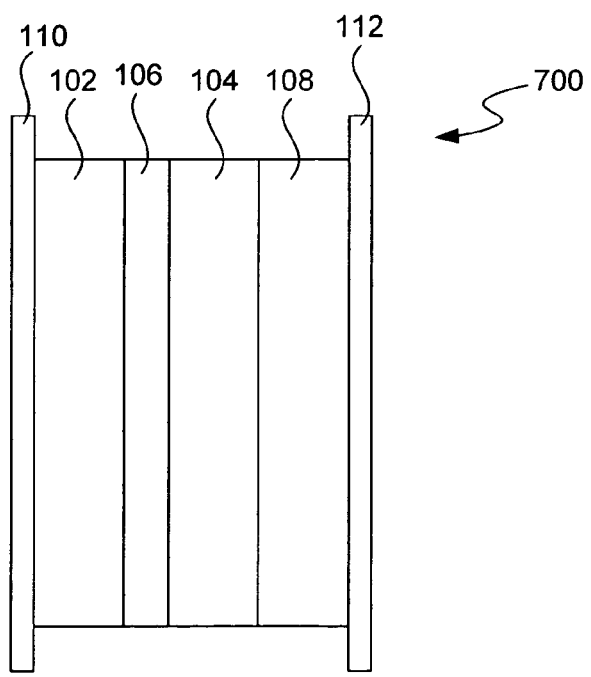
FIG. 7 is a schematic illustration of an active metal battery cell incorporating a protective interlayer in accordance with the present invention.

FIG. 7 illustrates a battery in accordance with the present invention. The battery cell 700 includes an electrochemical structure incorporating an ionically conductive chemically compatible protective interlayer, as described with reference to FIG. 1. The cell 700 is composed of an active metal electrode 102 on an anode current collector 110, a polymer electrolyte 104, and a protective interlayer 106, as described above. The cell 700 further includes a cathode 108 connected with a cathode current collector 112, composed of a conductive metal such as aluminum. Suitable positive electrodes to couple with the electrochemical structure in such battery cells include: for both primary and rechargeable cells, elemental sulfur-based electrodes, lithium polysulfide based electrodes, metal oxide-based electrodes (e.g., $V_2O_5$, $V6O_{13}$, $AgV_2O_5$), and metal sulfide based electrodes (e.g., $FeS_2$); for primary cells, metal oxide-based electrodes, such as $MnO_2$, CuO, $Ag_2CrO_4$ and $MoO_3$; for primary cells, metal sulfide-based electrode, such as CuS and FeS; for rechargeable cells metal oxide-based electrodes, such as $Li_xCoO2$, $Li_xNiO_2$, $Li_xMn_2O_4$ and $LiFePO_4$; and, for rechargeable cells, a metal sulfide based electrode such as $TiS_2$.

Additional materials and techniques for fabrication of active metal battery cells are described, for example, in U.S. Pat. No. 5,686,201 issued to Chu on Nov. 11, 1997. Further description of materials and techniques for fabrication of active metal battery cells having anode protective layers are described, for example, in U.S. patent application Ser. No. 09/139,601, filed Aug. 25, 1998 (now U.S. Pat. No. 6,214,061, issued Apr. 10, 2001), titled ENCAPSULATED LITHIUM ALLOY ELECTRODES HAVING BARRIER LAYERS, and naming May-Ying Chu, Steven J. Visco and Lutgard C. DeJonge as inventors; U.S. patent application Ser. No. 09/086,665 filed May 29, 1998 (now U.S. Pat. No. 6,025,094, issued May 15, 2000), titled PROTECTIVE COATINGS FOR NEGATIVE ELECTRODES, and naming Steven J. Visco and May-Ying Chu as inventors; U.S. patent application Ser. No. 09/139,603 filed Aug. 25, 1998 (now U.S. Pat. No. 6,402,795, issued Jun. 11, 2002), titled "PLATING METAL NEGATIVE ELECTRODES UNDER PROTECTIVE COATINGS," and naming May-Ying Chu, Steven J. Visco and Lutgard C. DeJonghe as inventors; U.S. patent application Ser. No. 09/139,601 filed Aug. 25, 1998 (now U.S. Pat. No. 6,214,061, issued Apr. 10, 2001), titled "METHOD FOR FORMING ENCAPSULATED LITHIUM ELECTRODES HAVING GLASS PROTECTIVE LAYERS," and naming Steven J. Visco and Floris Y. Tsang as inventors. The active metal electrode may also be an active metal alloy electrode, as further described in U.S. patent application Ser. No. 10/189,908 filed Jul. 3, 2002, titled "ENCAPSULATED ALLOY ELECTRODES," and naming Steven J. Visco, Yevgeniy S. Nimon and Bruce D. Katz as inventors. The battery component materials, including anodes, cathodes, separators, protective layers, etc., and techniques disclosed therein are generally applicable to the present invention and each of these patent applications is incorporated herein by reference in its entirety for all purposes.

Conclusion

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A method of fabricating an electrochemical device component structure, the method comprising:
    applying a layer consisting of a protective interlayer precursor selected from the group consisting of $Cu_3N$ metal phosphides, $Cu_3N$, red phosphorus, phosphines, borazine ($B_3N_3H_6$), and triazine ($C_3N_3H_3$) on a polymer electrolyte; and
    applying an active metal selected from the group consisting of alkali metals, alkaline earth metals and alloys thereof to the layer of precursor on the polymer electrolyte;
    whereby the precursor is converted to a reaction product formed by contact of the active metal with the precursor such that a protective interlayer conductive to ions of the active metal is formed in situ between the active metal and the polymer electrolyte.

2. The method of claim 1, wherein the active metal comprises an anode.

3. The method of claim 2, further comprising applying a current collector on a surface of the active metal anode opposite that in contact with the protective interlayer.

4. The method of claim 1, wherein the active metal is an alkali metal or alloy thereof.

5. The method of claim 4, wherein the active metal is lithium or a lithium alloy.

6. The method of claim 1, wherein the precursor is red phosphorus, the active metal is lithium, and the protective interlayer formed in situ on reaction with the active metal is $Li_3P$.

7. The method of claim 6, wherein the precursor and active metal are applied by evaporation.

8. The method of claim 1, wherein the precursor is $Cu_3N$, the active metal is lithium, and the protective interlayer formed in situ on reaction with the active metal is $Li_3N$.

* * * * *